(12) United States Patent
Saito et al.

(10) Patent No.: US 11,000,995 B2
(45) Date of Patent: May 11, 2021

(54) THREE-DIMENSIONAL MODELING APPARATUS AND THREE-DIMENSIONAL MODELING METHOD

(71) Applicant: Seiko Epson Corporation, Tokyo (JP)

(72) Inventors: Koichi Saito, Matsumoto (JP);
Shunsuke Mizukami, Fujimi (JP);
Kazuhide Nakamura, Asahi-mura (JP)

(73) Assignee: Seiko Epson Corporation

( * ) Notice: Subject to any disclaimer, the term of this patent is extended or adjusted under 35 U.S.C. 154(b) by 282 days.

(21) Appl. No.: 15/951,350

(22) Filed: Apr. 12, 2018

(65) Prior Publication Data

US 2018/0311894 A1     Nov. 1, 2018

(30) Foreign Application Priority Data

Apr. 28, 2017  (JP) .............................. JP2017-089248

(51) Int. Cl.
| | |
|---|---|
| *B33Y 30/00* | (2015.01) |
| *B29C 64/209* | (2017.01) |
| *B29C 64/40* | (2017.01) |
| *B29C 64/295* | (2017.01) |
| *B29C 64/241* | (2017.01) |
| *B29C 64/106* | (2017.01) |
| *B33Y 70/00* | (2020.01) |
| *B33Y 10/00* | (2015.01) |

(52) U.S. Cl.
CPC .......... *B29C 64/209* (2017.08); *B29C 64/106* (2017.08); *B29C 64/241* (2017.08); *B29C 64/295* (2017.08); *B29C 64/40* (2017.08); *B33Y 30/00* (2014.12); *B33Y 10/00* (2014.12); *B33Y 70/00* (2014.12)

(58) Field of Classification Search
CPC ... B29C 64/209; B29C 64/295; B29C 64/241; B29C 64/40; B29C 64/106; B33Y 30/00; B33Y 10/00; B33Y 70/00
USPC ........................................................ 264/464
See application file for complete search history.

(56) References Cited

U.S. PATENT DOCUMENTS

| | | | |
|---|---|---|---|
| 2012/0193335 A1 | 8/2012 | Guldberg | |
| 2015/0190967 A1* | 7/2015 | Stava | .................... B29C 64/106 427/256 |
| 2016/0046073 A1 | 2/2016 | Hadas | |
| 2017/0008230 A1 | 1/2017 | Yuyama | |
| 2017/0120517 A1 | 5/2017 | Shimoyama | |

(Continued)

FOREIGN PATENT DOCUMENTS

| | | |
|---|---|---|
| EP | 0967067 A1 | 12/1999 |
| JP | S58-124626 A | 7/1983 |

(Continued)

OTHER PUBLICATIONS

Extended European Search Report for EP Application No. 18168661. 9, dated Sep. 7, 2018 (8 pages).

*Primary Examiner* — Jeffrey M Wollschlager
*Assistant Examiner* — Xue H Liu
(74) *Attorney, Agent, or Firm* — Harness, Dickey & Pierce, P.L.C.

(57) ABSTRACT

A three-dimensional modeling apparatus includes a drive motor, a plasticizing section having a flat screw configured to be rotated by the drive motor, the plasticizing section being configured to plasticize and convert the material into a molten material by the rotation of the flat screw, and a nozzle configured to inject the molten material.

9 Claims, 7 Drawing Sheets

(56) References Cited

U.S. PATENT DOCUMENTS

2017/0210069 A1 7/2017 Stubenruss
2017/0210074 A1 7/2017 Ueda et al.

FOREIGN PATENT DOCUMENTS

| | | |
|---|---|---|
| JP | S61-262107 A | 11/1986 |
| JP | H09-011337 A | 1/1997 |
| JP | 2006-192710 A | 7/2006 |
| JP | 2013-501627 A | 1/2013 |
| JP | 2015-178191 A | 10/2015 |
| JP | 2016-147447 A | 8/2016 |
| JP | 2017-052129 A | 3/2017 |
| KR | 10-2016-0111579 A | 9/2016 |
| NO | 2015-129733 A1 | 9/2015 |
| NO | 2015-182675 A1 | 12/2015 |
| WO | WO-97-24217 A1 | 7/1997 |
| WO | WO-2016-020150 A1 | 2/2016 |

* cited by examiner

| NOZZLE No. | CROSS-SECTIONAL SHAPE OF NOZZLE HOLE | DIAMETER OF NOZZLE HOLE | SURFACE ROUGHNESS Rz |
|---|---|---|---|
| #1 | ROUND | ⌀1 mm | 0.55 mm |
| #2 | ROUND | ⌀0.3 mm | 0.15 mm |
| #3 | QUADRANGLE | □1 mm | 0.20 mm |

THREE-DIMENSIONAL MODELING APPARATUS AND THREE-DIMENSIONAL MODELING METHOD

This application claims priority under 35 U.S.C. § 119 to Japanese Patent Application No. 2017-089248 filed on Apr. 28, 2017, the entire disclosure of which is expressly incorporated by reference herein.

BACKGROUND

1. Technical Field

The present invention relates to a three-dimensional modeling technique that uses a thermoplastic.

2. Related Art

JP-A-2006-192710 describes an extrusion-deposition-lamination modeling apparatus that uses a molten resin. This apparatus melts a wire-like thermoplastic material by using a preheater and extrudes the molten material from an extrusion nozzle by using the rotation of an elongated screw to produce a three-dimensional object. Since such three-dimensional objects produced by extrusion have many gaps and the degree of filling is low, solvent is supplied to the cured material to dissolve the cured material to reduce the gaps in the three-dimensional objects.

The above-described known technique extrudes the molten material by the rotation of the elongated screw, and thus the height of the entire apparatus becomes considerably large and downsizing of the apparatus has been hindered. Furthermore, due to lots of gaps in the objects produced by laminating the material extruded from the nozzle, their modeling precision is low, and it is necessary to use solvent to increase the modeling precision. Accordingly, such a three-dimensional modeling technique requires further downsizing of the apparatuses and more precise three-dimensional modeling.

SUMMARY

The invention has been made to solve at least a part of the problems mentioned above and can be embodied in the following aspects.

(1) According to a first aspect of the invention, a three-dimensional modeling apparatus for producing a three-dimensional object using a thermoplastic material is provided. The three-dimensional modeling apparatus includes a drive motor, a plasticizing section having a flat screw configured to be rotated by the drive motor, the plasticizing section being configured to plasticize and convert the material into a molten material by the rotation of the flat screw, and a nozzle configured to inject the molten material. The three-dimensional modeling apparatus according to this aspect plasticizes a material by using the plasticizing section that includes the flat screw, and thus the height of the apparatus can be reduced and the size of the entire apparatus can be reduced.

(2) In this three-dimensional modeling apparatus, a cross-section of a nozzle hole of the nozzle may have a shape that enables the molten material injected from the nozzle hole to have a cross-section closer to a polygonal shape than a round shape. According to the three-dimensional modeling apparatus, the molten material injected from nozzle hole has a cross section closer to a polygonal shape than a round shape, and thus gaps in the deposited linear molten material can be reduced. Consequently, the surface roughness of the three-dimensional object becomes small and the modeling precision can be increased.

(3) In this three-dimensional modeling apparatus, the cross-section of the nozzle hole may be a substantially quadrangular shape. According to this three-dimensional modeling apparatus, gaps in the deposited linear molten material can be further reduced and thus the surface roughness of the three-dimensional object can be further reduced and the modeling precision can be increased.

(4) In this three-dimensional modeling apparatus, the nozzle may have a plurality of nozzle holes. According to this three-dimensional modeling apparatus, the shape of the molten material injected from the nozzle can be adjusted by the arrangement of the nozzle holes. Consequently, the surface roughness can be reduced and the design of the three-dimensional object can be improved.

(5) In this three-dimensional modeling apparatus, the nozzle holes may be arranged in a matrix. According to this three-dimensional modeling apparatus, the nozzle holes arranged in the matrix enables the molten material injected from the nozzle to have an entire cross section close to a quadrangular shape, and thus the surface roughness can be further reduced.

(6) In this three-dimensional modeling apparatus, the nozzle may be placed so as to form a gap 1.1 times or more and 1.5 times or less than a hole diameter of the nozzle hole of the nozzle between an upper surface of the three-dimensional object being produced and a tip of the nozzle. According to this three-dimensional modeling apparatus, the molten material injected from the tip of the nozzle is deposited on the upper surface of the three-dimensional object in a free state in which the molten material is not pressed against the upper surface of the three-dimensional object being produced. Accordingly, the molten material injected from the nozzle can be deposited while maintaining its cross-sectional shape, and thus the surface roughness of the three-dimensional object can be reduced. As a result, the surface roughness of the three-dimensional object can be further reduced.

(7) The three-dimensional modeling apparatus may further include a modeling base on which the three-dimensional object being produced is placed, and a moving mechanism configured to change the relative positional relationship between the nozzle and the modeling base. According to this three-dimensional modeling apparatus, by changing the relative positional relationship between the nozzle and the modeling base using the moving mechanism, a three-dimensional object of a desired shape can be produced.

(8) In this three-dimensional modeling apparatus, a plurality of injection units each having the drive motor, the plasticizing section, and the nozzle may be provided. According to this three-dimensional modeling apparatus, different molten materials can be injected from the injection units, and thus various three-dimensional objects can be produced.

(9) According to a second aspect of the invention, a method for producing a three-dimensional object using a thermoplastic material is provided. This method includes plasticizing and converting the material into a molten material by the rotation of a flat screw, and injecting the molten material by using a nozzle to produce the three-dimensional object. According to this method for producing a three-dimensional object, a material is plasticized by using a plasticizing section that includes a flat screw, and thus the three-dimensional object can be produced by using the small apparatus.

It is to be understood that the present invention can be implemented in various forms other than the above-described examples. For example, a computer program for implementing functions of a three-dimensional modeling apparatus and a three-dimensional modeling method, and a non-transitory storage medium storing the computer program may be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
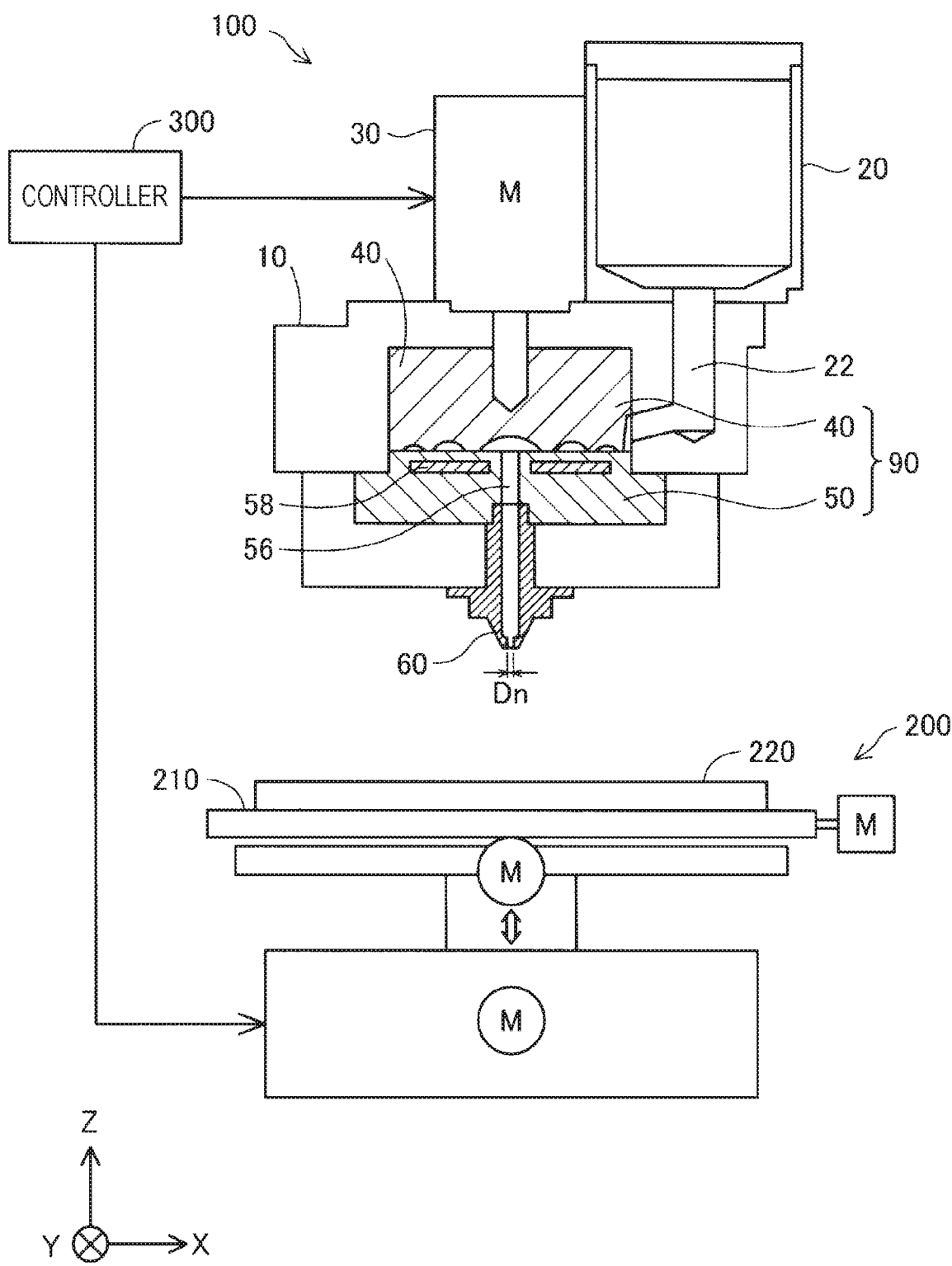
FIG. 1 is a conceptual view of a three-dimensional modeling apparatus.

FIG. 1 is a conceptual view of a three-dimensional modeling apparatus according to an embodiment. The three-dimensional modeling apparatus includes an injection unit 100, a moving mechanism 200, and a controller 300. FIG. 1 shows three mutually perpendicular directions X, Y, and Z. The X direction and the Y direction are horizontal directions, and the Z direction is a vertical direction. These directions are also shown in other drawings as necessary.

The injection unit 100 includes a screw case 10, a hopper 20 for containing a material, a drive motor 30, a flat screw 40, a screw facing section 50, and a nozzle 60 for injecting a molten material. The flat screw 40 and the screw facing section 50 constitute a plasticizing section 90 for plasticizing a thermoplastic material to produce a molten material. The expression "plasticizing" means to heat and melt a material.

A thermoplastic material is put into the hopper 20. Examples of the material include polypropylene (PP), polyethylene (PE), polyacetal (POM), polyvinyl chloride (PVC), polyamide (PA), acrylonitrile butadiene styrene (ABS), polylactic acid (PLA), polyphenylene sulfide (PPS), polyether ether ketone (PEEK), and polycarbonate (PC). Examples of shape of the materials include shapes of sold materials such as pellets and powder.

The flat screw 40 of the plasticizing section 90 is accommodated in the screw case 10 and is rotated by the drive motor 30. A material is supplied from the hopper 20 to a side surface of the flat screw 40 through a communication path 22. The material is plasticized by the rotation of the flat screw 40 to become a molten material in a space between a lower surface of the flat screw 40 and an upper surface of the screw facing section 50. A heater 58 for heating the material is embedded in the screw facing section 50. The molten material is supplied to the nozzle through a communication hole 56 that is provided at a central portion of the screw facing section 50 and injected by the nozzle 60. A tip portion of the nozzle 60 has a nozzle hole diameter Dn.

The moving mechanism 200 is a three-axis positioner that can move a modeling base 220 that is placed on a table 210 in the three directions of the X direction, Y direction, and Z direction. The moving mechanism 200 has a function for changing the relative positional relationship between the nozzle 60 and the modeling base 220. The change in the relative positional relationship between the nozzle 60 and the modeling base 220 by the moving mechanism 200 enables production of a three-dimensional object of a desired shape. In this embodiment, the moving mechanism 200 three-dimensionally moves the modeling base 220; however, as the moving mechanism 200, a mechanism that three-dimensionally moves the nozzle 60 (the injection unit 100) may be employed. Alternatively, a mechanism in which one of the nozzle 60 (the injection unit 100) and the modeling base 220 is moved in one or two axial directions and the other one is moved in the remaining axial direction may be employed.

The controller 300 controls the drive motor 30 of the injection unit 100 and the moving mechanism 200. The controller 300 can be implemented, for example, by a computer that includes a processor such as a central processing unit (CPU), a main memory, and a nonvolatile memory. A nonvolatile memory in the controller 300 stores a computer program for controlling the three-dimensional modeling apparatus.

Figure 2:
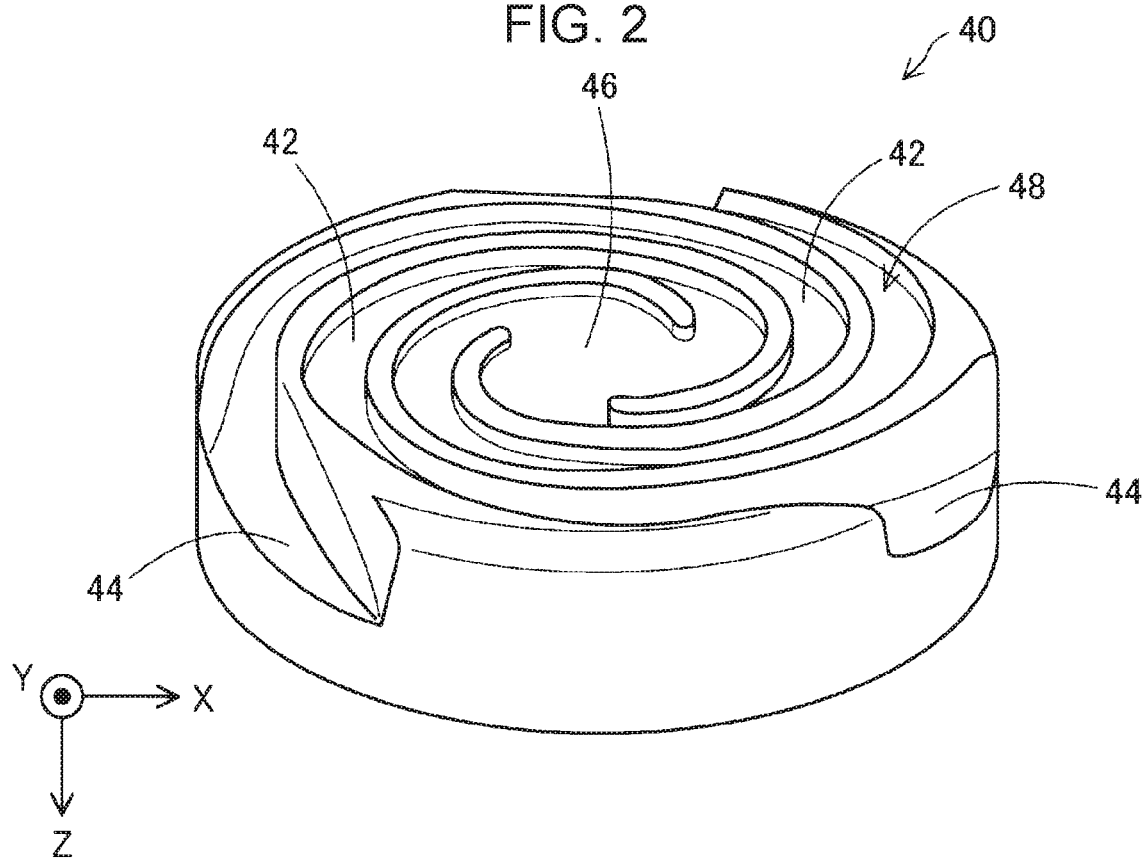
FIG. 2 is a perspective view of a flat screw.

FIG. 2 is a perspective view illustrating the flat screw 40. The flat screw 40 is a substantially cylindrical screw and the height of the flat screw 40 in the axial direction is smaller than its diameter. The flat screw 40 has a plurality of scroll grooves 42 on a surface that faces the screw facing section 50 (FIG. 1). The surface on which the scroll grooves 42 are formed is referred to as a "scroll-groove formed surface 48". The scroll grooves 42 are formed in a shape like the involute of a circle or a spiral shape from the outer periphery of the flat screw 40 toward a central portion 46 of the scroll-groove formed surface 48. The scroll grooves 42 are continuous with material inlets 44 that are formed on the side surface of the flat screw 40. The material inlets 44 accept a material supplied from the hopper 20 through the communication path 22. The rotating flat screw 40 heats and plasticizes the material to melt, converting it into a molten material.

Figure 3:
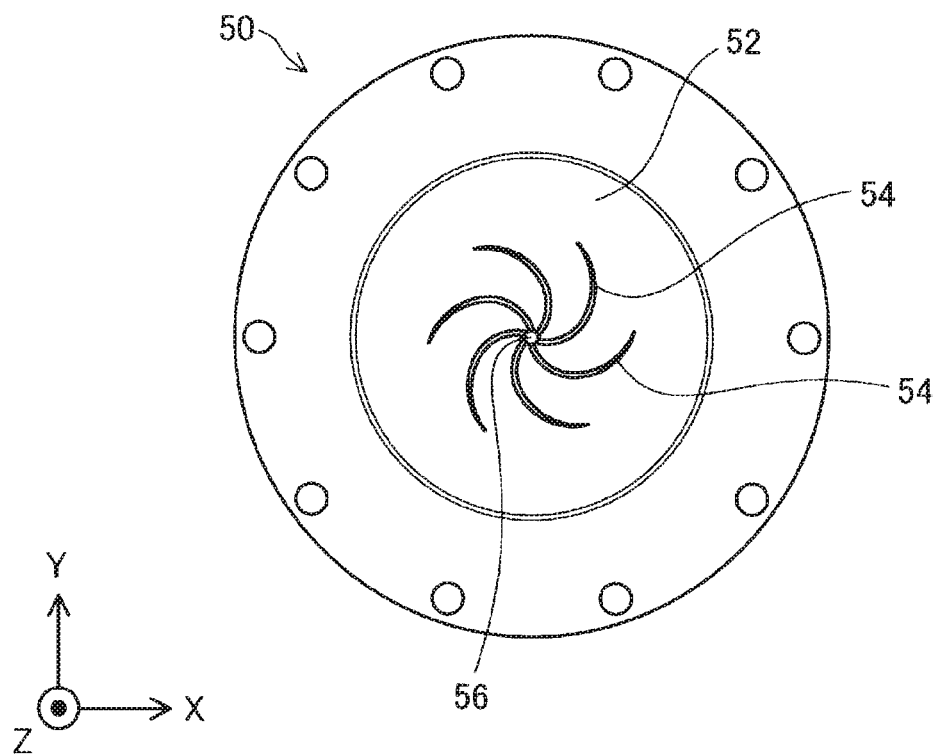
FIG. 3 is a plan view of a screw facing section.

FIG. 3 is a plan view of the screw facing section 50. The screw facing section 50 has a screw facing surface that faces the scroll-groove formed surface 48 of the flat screw 40. The screw facing surface 52 has a plurality of guide grooves 54 formed in a spiral shape. At a central portion of the screw facing surface 52, a communication hole for supplying a molten material to the nozzle 60 is formed. The guide grooves 54 have a function to guide a molten material to the communication hole 56. As illustrated in FIG. 1, the heater 58 for heating a material is embedded in the screw facing section 50. The heating by the heater 58 and the rotation of the flat screw 40 plasticize a material.

A molten material is heated to its glass transition point or more and is injected from the nozzle 60 in a completely melted state. For example, an ABS resin has a glass transition point of about 120° C. and is inject from the nozzle 60 at a temperature about 200° C. To inject the molten material at such a high temperature, a heater may be provided around the nozzle 60.

Figure 4:
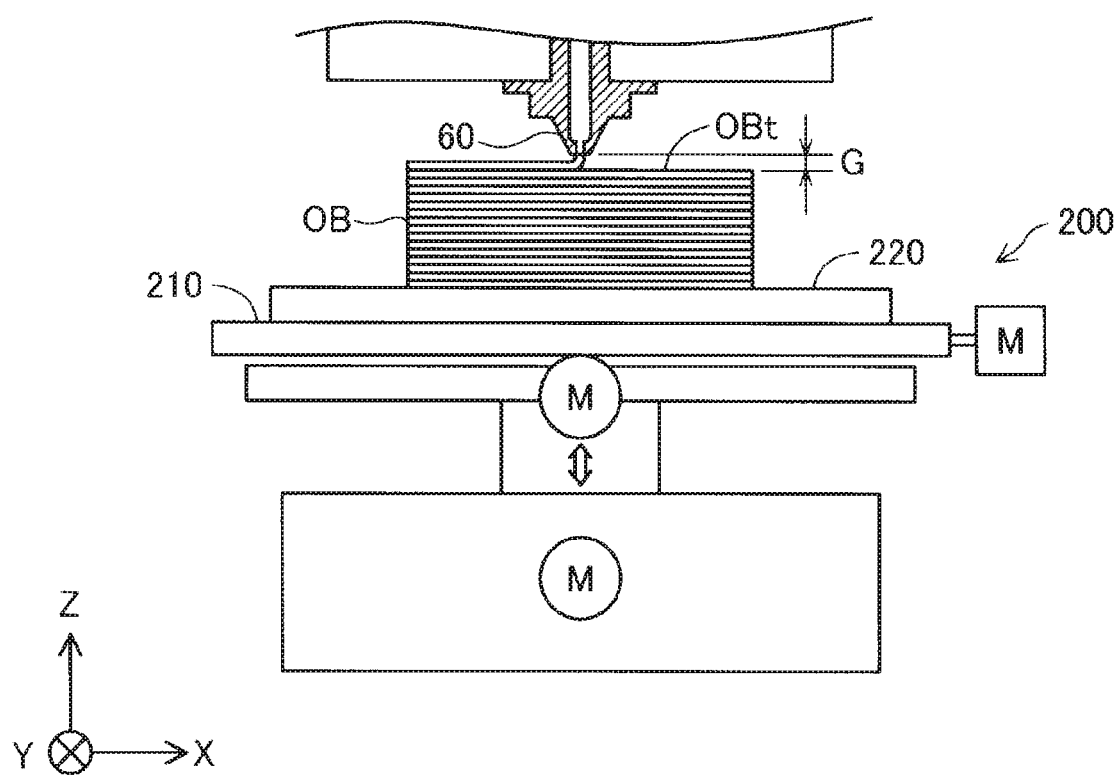
FIG. 4 illustrates a positional relationship between a three-dimensional object and a nozzle tip.

FIG. 4 illustrates a positional relationship between a three-dimensional object and the nozzle tip. On the modeling base 220, a three-dimensional object OB that is being produced is placed. A gap G is provided between the tip of the nozzle 60 and the upper surface OBt of the three-dimensional object OB. Here, "the upper surface OBt of the three-dimensional object OB" means a portion onto which a molten material injected from the nozzle 60 will land in the vicinity of an area immediately below the nozzle 60. It is preferable that the size of the gap G be, for example, 1.1 times or more and 1.5 times or less than the hole diameter Dn (FIG. 1) of the nozzle hole of the nozzle 60 and more preferably, 1.1 times or more and 1.3 times or less. With this gap, the molten material injected from the tip of the nozzle 60 is deposited on the upper surface OBt of the three-dimensional object OB in a free state in which the molten material is not pressed against the upper surface OBt of the three-dimensional object OB being produced. Accordingly, the molten material injected from the nozzle 60 can be deposited while maintaining its cross-sectional shape, and thus the surface roughness of the three-dimensional object OB can be reduced. With a heater provided around the nozzle 60 to inject the molten material at a high temperature, if the molten material is deposited by the nozzle 60 while being pressed against the upper surface OBt of the three-dimensional object, the deposited material is continuously heated and overheated by the nozzle 60, causing problems such as discoloration and deterioration. However, if the gap G is provided between the tip of the nozzle 60 and the upper surface OBt of the three-dimensional object OB, such overheating of the material can be prevented. Furthermore, if the gap G is larger than 1.5 times the hole diameter Dn (FIG. 1) of the nozzle hole, the accuracy with respect to the portion onto which the molten material will land and the adhesion to the upper surface OBt of the three-dimensional object OB being produced may be lowered.

Figure 5:
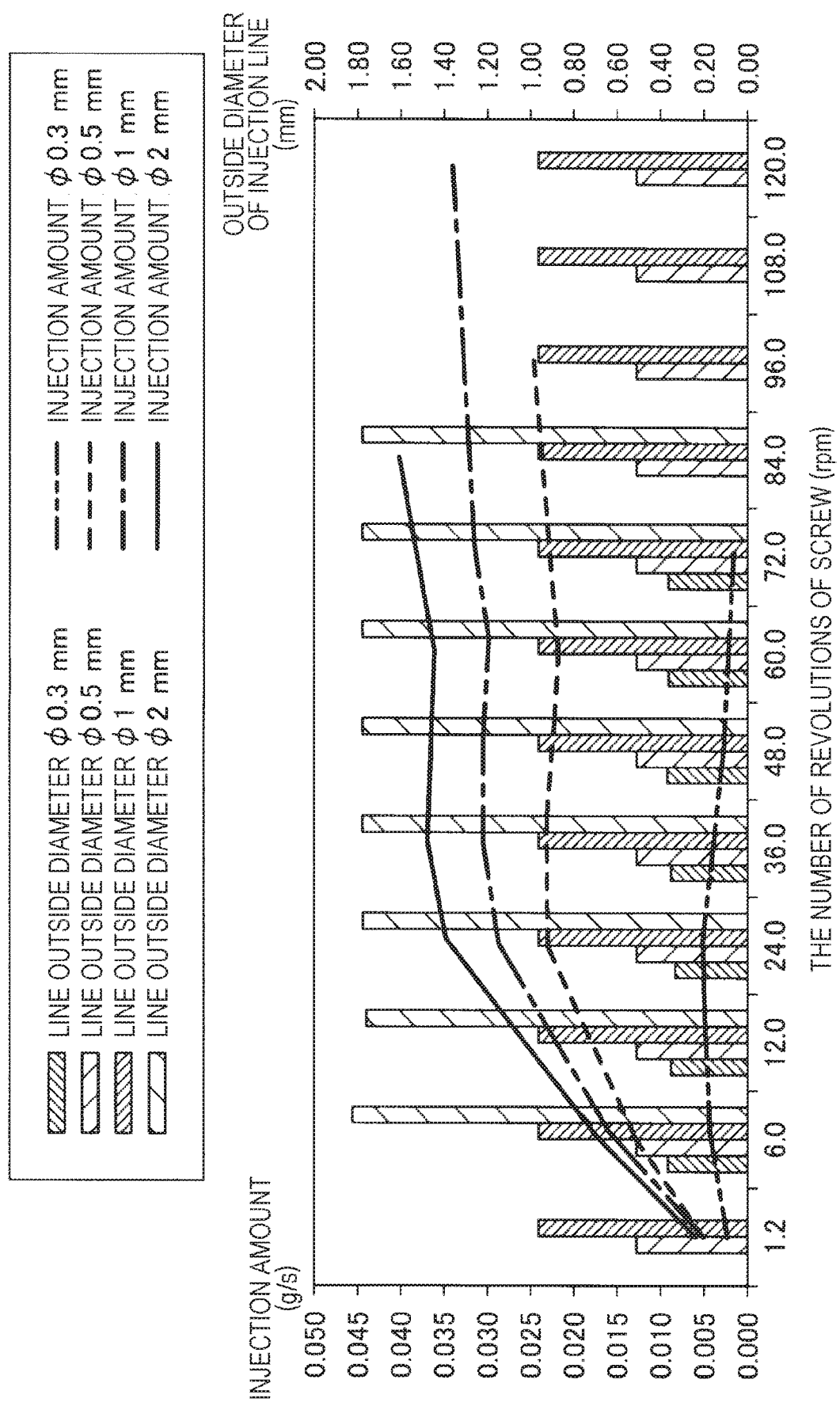
FIG. 5 is a graph showing the change in the injection amount and the injection line outside diameter according to the change in the number of rotations of the screw.

FIG. 5 is a graph showing the change in the injection amount and the injection line outside diameter according to the change in the number of rotations of the screw. The horizontal axis shows the number of rotations (rpm) of the flat screw 40. The vertical axis on the left side and the line graph show the amount (g/s) of the injected molten material. The vertical axis on the right side and the bar graph show the outside diameter (mm) of the injection line of the molten material. Here, "outside diameter of the injection line" means an outside diameter of a linear material injected from the nozzle 60. The outside diameter of the injection line is a dimension measured after a molten material has been injected from the nozzle 60 vertically downward in a free state. In this embodiment, an ABS resin was used as the material and a nozzle that has nozzle holes of four circular cross sections of nozzle hole diameters of 0.3 mm, 0.5 mm, 1.0 mm, and 2 mm was used as the nozzle 60. The plasticizing section 90 was set to 260° C., and the nozzle 60 was set to 200° C.

The line graph of the injection amount shows that the injection amount increased substantially linearly as the number of rotations of the screw increased within the range the number of rotations of the screw was 24 rpm or less. In contrast, after the number of rotations of the screw exceeded 24 rpm, the injection amount hardly increased even if the number of rotations of the screw increased. Consequently, it is preferable to perform the modeling at a screw rotation speed of 24 rpm or less.

The bar graph of the outside diameter of the injection line shows that the outside diameter of the injection line was approximately constant irrespective of the number of rotations of the screw. Consequently, even if the injection amount is increased, the outside diameter of the injection line does not increase. The outside diameter of the injection line is generally a major factor in determining the surface roughness of a three-dimensional object. Specifically, the larger the outside diameter of the injection line, the larger the surface roughness of the three-dimensional object, and the lower the modeling precision. According to the injection unit 100 in this embodiment, the outside diameter of the injection line is substantially constant even if the injection amount is increased, and thus the modeling can be performed at a high speed without increasing the surface roughness.

The injection unit 100 according to the embodiment plasticizes and changes a material into a molten state by using the flat screw 40 and injects the molten material from the nozzle 60 to produce a three-dimensional object. Accordingly, various materials of various shapes can be used to produce a three-dimensional object. This feature is a great advantage over known fused deposition molding (FDM) three-dimensional (3D) printers, that is, thermal-melt-lamination 3D printers that require a filament of a material.

Figures 6, 7:
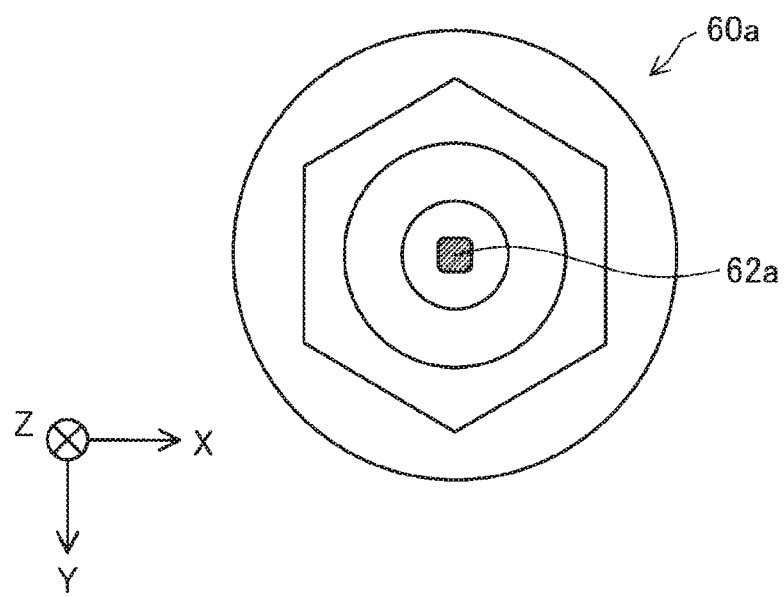
FIG. 6 illustrates an example nozzle hole.
FIG. 7 illustrates a relationship among the nozzle hole shape, nozzle hole diameter, and surface roughness.

FIG. 6 illustrates an example nozzle hole. A nozzle hole 62a of a nozzle 60a has a substantially quadrangular cross section. Specifically, the cross section of the nozzle hole 62a is a square shape and its four corners are R-chamfered at R0.1. The nozzle 60a of such a shape enables the molten material injected from the nozzle hole 62a to have a cross section that is closer to a square shape than a round shape. Consequently, the gaps in the deposited linear molten material can be reduced. The shape of the cross section of the nozzle hole 62a may be a shape close to a polygonal shape other than a quadrangular shape, for example, a hexagonal shape.

In the description of FIG. 6, the small letter "a" attached to the end of the reference numerals of the nozzle 60a and the nozzle hole 62a is an additional reference numeral for indicating a specific example shape. In a case where such an additional reference numeral is not necessary, the reference numeral "a" is omitted in the description. The same applies to reference numerals "b" and "c" in the following other examples.

FIG. 7 illustrates a relationship among the shape, the nozzle hole diameter, and the surface roughness of the nozzle hole 62. As the nozzle 60, the nozzle holes 62 of circular cross sections (nozzle numbers #1 and #2) and a quadrangular cross section (nozzle number #3) were used. The nozzle of the nozzle number #3 is the nozzle 60a in FIG. 6 described above. The diameter of the nozzle hole 62 of the nozzle number #1 is 1 mm, the diameter of the nozzle hole 62 of the nozzle number #2 is 0.3 mm, and each side of the nozzle hole 62 of the nozzle number #3 is 1 mm. Using these three types of nozzles 60, three-dimensional objects of the three types were produced respectively, and their surface roughness Rz were measured. The surface roughness Rz is a "maximum height Rz" that is defined by JIS B 0601: 2013.

In this specification, "the diameter of the nozzle hole 62" means its diameter when the cross section of the nozzle hole 62 is circular. When the cross section of the nozzle hole 62 is a square shape, it means the length of one side of the nozzle hole 62. When the cross section of the nozzle hole 62 is a quadrangular shape, it means the length of a long side.

When the nozzle 60 of the nozzle numbers #1 and #2 having the circular cross sections in the nozzle hole 62 were used, the surface roughness Rz was about half of the hole diameter of the nozzle hole 62. This is because, from the nozzle hole 62 having circular cross sections, the linear molten materials having substantially circular cross sections were injected and deposited respectively, and thus half of the diameters were the surface roughness (maximum heights Rz) of the three-dimensional objects. In contrast, when the nozzle 60 of the nozzle number #3 having the quadrangular cross section (to be specific, square) in the nozzle hole 62 was used, the surface roughness Rz was much smaller than half of the hole diameter (1 mm on each side) of the nozzle hole 62. This is because, from the nozzle hole 62 having the quadrangular cross section, the linear molten material having a substantially quadrangular cross section was injected and deposited, and thus small gaps in the substantially quadrangular corners of the material were the surface roughness (maximum heights Rz) of the three-dimensional object. From this result, it is preferable that the cross section of the nozzle hole 62 of the nozzle 60 be closer to a quadrangular shape than a round shape.

Figure 8:
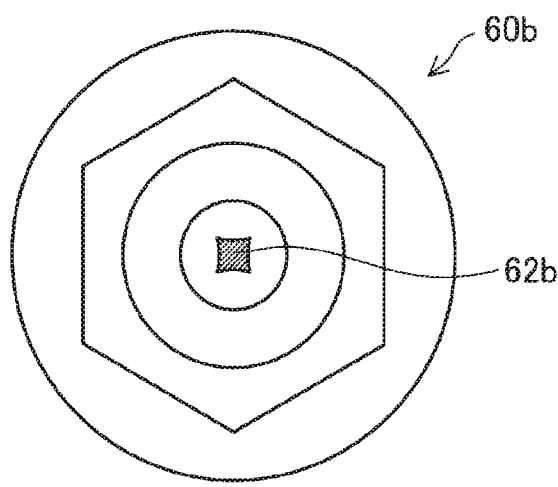
FIG. 8 illustrates another example nozzle hole.

FIG. 8 illustrates another example nozzle hole 62. A nozzle hole 62b of a nozzle 60b has a cross section that is distorted like a pincushion. Specifically, the four sides of the cross section of the nozzle hole 62b are concavely curved from the corners toward the center respectively. The cross-sectional shape of the nozzle hole 62d is also a substantially quadrangular shape. The nozzle 60b of such a shape enables the molten material injected from the nozzle hole 62b to have a cross section that is further closer to a quadrangular shape or a square shape than the nozzle 60a in FIG. 6. Consequently, the gaps in the deposited linear molten material can be further reduced.

As will be understood from the above-described examples in FIG. 6 and FIG. 8, it is preferable that the cross section of the nozzle hole 62 have the shape that enable the molten material injected from the nozzle hole 62 to have a cross section closer to a polygonal shape (particularly, a quadrangular shape) than a round shape. With this shape, the molten material injected from nozzle hole 62 has a cross section closer to a polygonal shape than a round shape, and thus the gaps in the deposited linear molten material can be reduced. Consequently, the surface roughness of the three-dimensional object is reduced and the modeling precision can be increased.

Figure 9:
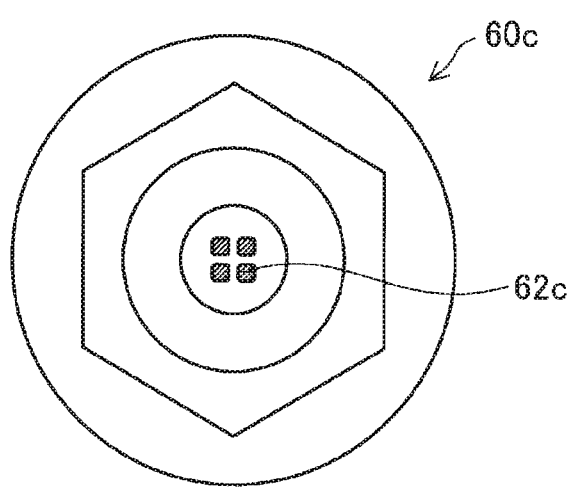
FIG. 9 illustrates still another example nozzle hole.

FIG. 9 illustrates still another example nozzle hole 62. A nozzle 60c has four nozzle holes 62c that are arranged in a matrix. The cross section of each nozzle hole 62c has a substantially quadrangular shape. As in this example, with the plurality of nozzle holes 62c, the shape of the molten material injected from the nozzle 60c can be adjusted by the arrangement of the nozzle holes 62c. Consequently, the surface roughness can be reduced and the design of the three-dimensional object can be improved. The arrangement of the nozzle holes 62c may be other arrangements than the matrix. However, the nozzle holes 62c arranged in the matrix enable the molten material injected from the nozzle 60c to have an entire cross section close to a quadrangular shape, and thus the surface roughness can be further reduced.

Figure 10:
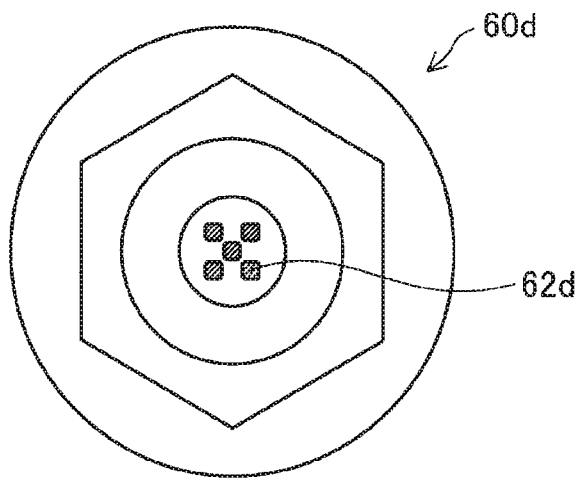
FIG. 10 illustrates still another example nozzle hole.

FIG. 10 illustrates still another example nozzle hole 62. A nozzle 60d has five nozzle holes 62d that are arranged in the layout of the spots of "5" of a die. With this arrangement of the nozzle holes 62d, the molten material injected from the nozzle 60d can be intentionally arranged to have an uneven unique shape. Consequently, the design of the surface of the three-dimensional object can be enhanced.

It should be noted that the cross sectional shapes and arrangements of the nozzle holes 62 illustrated in FIG. 6, FIG. 8, FIG. 9, and FIG. 10 are only examples, and various cross sectional shapes and arrangements other than these examples may be employed.

As described above, the three-dimensional modeling apparatus according to the embodiment plasticizes a material by using the plasticizing section 90, which includes the flat screw 40, and thus the height of the apparatus can be reduced and the size of the entire apparatus can be reduced. Furthermore, by devising the shapes, the number, and the arrangements of the nozzle holes 62 of the nozzle 60, the modeling precision and design of three-dimensional objects can be improved.

Figure 11:
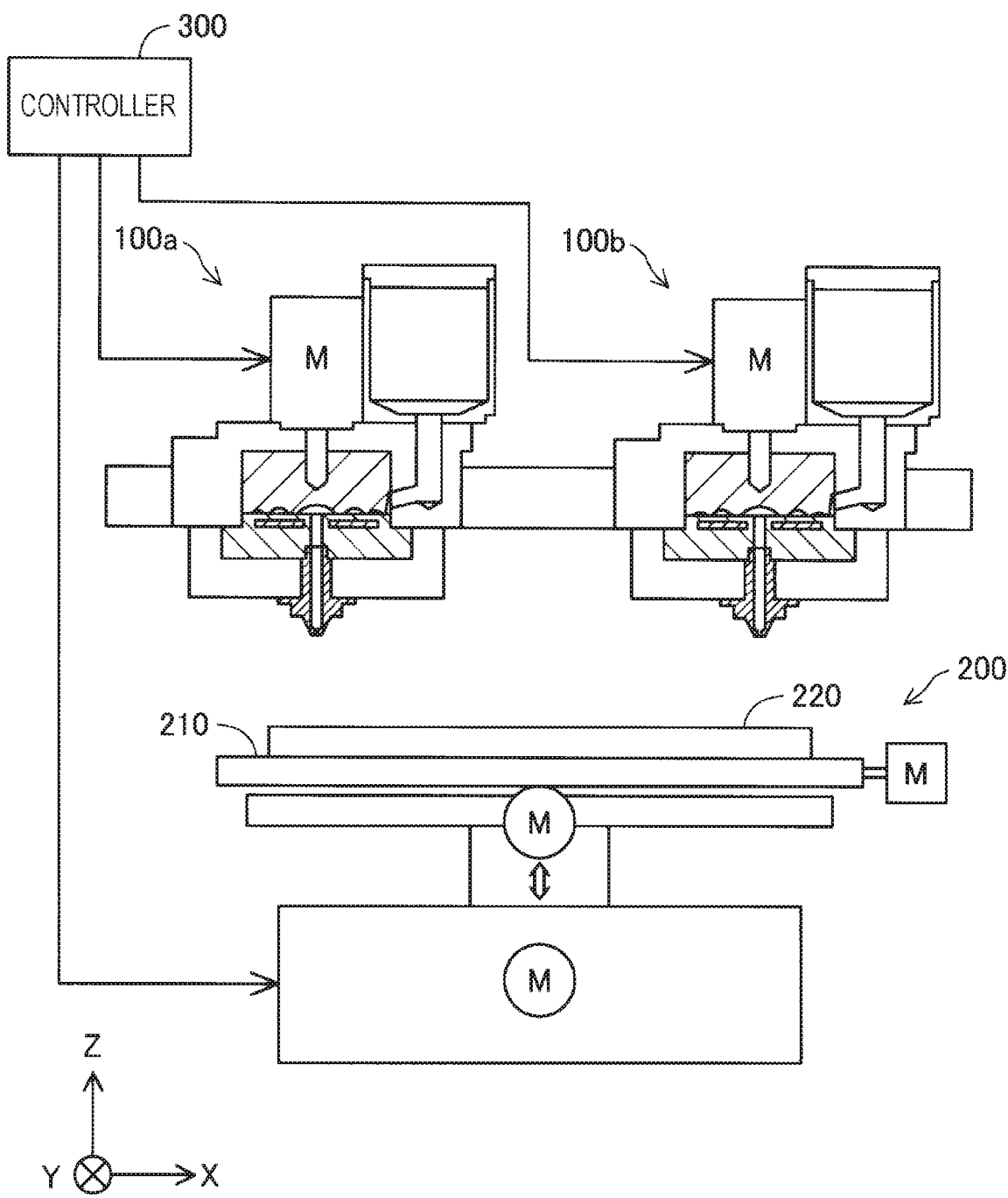
FIG. 11 is a conceptual view of a three-dimensional modeling apparatus according to another embodiment.

FIG. 11 is a conceptual view of a three-dimensional modeling apparatus according to another embodiment. This three-dimensional modeling apparatus is different from the embodiment illustrated in FIG. 1 in that the three-dimensional modeling apparatus includes two injection units 100a and 100b, and other components are similar to those in FIG. 1. The structure of each of the injection units 100a and 100b is similar to that of the injection unit 100 illustrated in FIG. 1, and its description will be omitted.

The three-dimensional modeling apparatus includes the injection units 100a and 100b and thus two different materials can be used to produce a three-dimensional object. Example combinations of two materials include the following combinations.

(1) Materials of Different Colors

With materials of different colors, a three-dimensional object of two different colors can be produced.

(2) Material for Support Material and Material for Modeling

A support material is a member for supporting the shape of a three-dimensional object and is a member to be removed after completion of the modeling. First, a support material is injected from one of the injection units 100a and 100b to produce a support member, and then, using the support member, a three-dimensional object is produced. With this method, more complicated and various three-dimensional objects can be produced.

(3) Materials of Different Properties

For example, with materials of different properties, a three-dimensional object of the materials suitable for its purpose can be produced.

It should be noted that the number of the injection units 100 is not limited to two, and alternatively, three or more injection units 100 may be provided.

The present invention is not limited to the above-described examples and embodiments, and various modifications can be made without departing from the scope of the invention. For example, the following modifications may be provided.

MODIFICATION 1

In the above-described embodiments, the three-dimensional modeling apparatuses include the hopper 20; however, the hopper 20 may be omitted.

The present invention is not limited to the above-described embodiments and modification, and various structures can be provided without departing from the scope of the invention. For example, technical features in the embodiments, examples, and modifications corresponding to the technical features in each embodiment described in SUMMARY may be replaced or combined to solve some or all of the above problems or to achieve some or all of the above-described effects. Unless the technical features are described as essential in this specification, the technical features may be omitted as appropriate.

What is claimed is:

1. A three-dimensional modeling apparatus for producing a three-dimensional object using solid material including a thermoplastic material, the three-dimensional modeling apparatus comprising:

a drive motor;
a plasticizing section having a flat screw and a screw-facing section, the flat screw having a scroll-groove formed surface on which a scroll groove is formed and configured to be rotated by the drive motor, and the screw-facing section facing the scroll-groove formed surface and having a communication hole, a heater, and a screw facing surface on which a guide groove that is directly connected to the communication hole is formed; and
a nozzle in communication with the communication hole and configured to inject a molten material,
wherein the plasticizing section is configured to plasticize the solid material supplied between the flat screw and the screw-facing section by rotation of the flat screw along with heating the solid material with the heater to convert the solid material into the molten material, and
wherein the scroll groove includes a first scroll groove and a second scroll groove, a depth of the first scroll groove is greater than a depth of the second scroll groove, and the second scroll groove is located closer to a center of the flat screw than the first scroll groove.

2. The three-dimensional modeling apparatus according to claim 1, wherein a cross-section of a nozzle hole of the nozzle has a shape that enables the molten material injected from the nozzle hole to have a polygonal cross-section.

3. The three-dimensional modeling apparatus according to claim 2, wherein the cross-section of the nozzle hole is a quadrangular shape.

4. The three-dimensional modeling apparatus according to claim 3, wherein the nozzle has a plurality of nozzle holes.

5. The three-dimensional modeling apparatus according to claim 4, wherein the nozzle holes are arranged in a matrix.

6. The three-dimensional modeling apparatus according to claim 1, wherein the nozzle is placed so as to form a gap 1.1 times or more and 1.5 times or less a hole diameter of the nozzle hole of the nozzle between an upper surface of the three-dimensional object being produced and a tip of the nozzle.

7. The three-dimensional modeling apparatus according to claim 1, further comprising:
a modeling base on which the three-dimensional object being produced is placed, the modeling base being movable to change a relative positional relationship between the nozzle and the modeling base.

8. The three-dimensional modeling apparatus according to claim 1, wherein the three-dimensional modeling apparatus includes a plurality of injection units each having the drive motor, the plasticizing section, and the nozzle.

9. A method for producing a three-dimensional object using a solid material including a thermoplastic material, the three-dimensional modeling method comprising:
introducing the solid material into a three-dimensional modeling apparatus including a plasticizing section that includes a rotatable flat screw and a screw-facing section, the rotatable flat screw having a scroll-groove formed surface on which a scroll groove is formed, and the screw-facing section having a communication hole, a heater, and a screw facing surface on which a guide groove that is directly connected to the communication hole is formed;
plasticizing and converting the solid material located between the flat screw and the screw-facing section into a molten material by rotating the rotatable flat screw and heating the solid material with the heater; and
injecting the molten material from a nozzle that communicates with the communication hole to produce the three-dimensional object,
wherein the scroll groove includes a first scroll groove and a second scroll groove, a depth of the first scroll groove is greater than a depth of the second scroll groove, and the second scroll groove is located closer to a center of the flat screw than the first scroll groove.

\* \* \* \* \*